United States Patent [19]
Nolasco

[11] Patent Number: 6,139,250
[45] Date of Patent: Oct. 31, 2000

[54] WHEEL LIFT WITH LATERALLY MOVABLE, ROTATABLE SWIVEL ARM WHEEL SCOOPS

[75] Inventor: Pablo Nolasco, Corona, N.Y.

[73] Assignee: Weldbuilt Body Co. Inc., Wyandanch, N.Y.

[21] Appl. No.: 09/072,420

[22] Filed: May 4, 1998

[51] Int. Cl.[7] .................................................. B60P 3/12
[52] U.S. Cl. .................... 414/563; 280/402; 414/428; 414/800
[58] Field of Search ........................... 254/3 R; 280/402; 414/426, 428, 563, 800, 918

[56] References Cited

U.S. PATENT DOCUMENTS

| | | |
|---|---|---|
| D. 310,980 | 10/1990 | Bubik ...................................... D12/14 |
| 3,434,607 | 3/1969 | Nelson . |
| 3,434,608 | 3/1969 | Nelson . |
| 3,620,393 | 11/1971 | Bubik . |
| 3,667,630 | 6/1972 | Scott . |
| 3,719,294 | 3/1973 | Aquilla . |
| 4,034,873 | 7/1977 | Haring . |
| 4,149,643 | 4/1979 | Skala ...................................... 414/563 |
| 4,239,275 | 12/1980 | Horneys et al. ........................ 414/478 |
| 4,368,002 | 1/1983 | Krzyzosiak, Jr. ...................... 414/494 |
| 4,383,807 | 5/1983 | Bubik ...................................... 414/563 |
| 4,384,817 | 5/1983 | Peterson ................................. 414/563 |
| 4,451,193 | 5/1984 | Cannon, Jr. et al. ................... 414/563 |
| 4,473,237 | 9/1984 | Lind ....................................... 280/402 |
| 4,473,334 | 9/1984 | Brown ..................................... 414/563 |
| 4,534,579 | 8/1985 | Shackleford, Sr. ..................... 280/402 |
| 4,557,496 | 12/1985 | Sill ......................................... 280/402 |
| 4,564,207 | 1/1986 | Russ ........................................ 280/402 |
| 4,573,857 | 3/1986 | Porter, Sr. et al. ..................... 414/563 |
| 4,586,866 | 5/1986 | Kvamme ................................. 414/563 |
| 4,632,629 | 12/1986 | Kooima ................................... 414/563 |
| 4,637,623 | 1/1987 | Bubik ...................................... 280/402 |
| 4,678,392 | 7/1987 | Capers et al. .......................... 414/563 |
| 4,679,978 | 7/1987 | Holmes et al. ......................... 414/563 |
| 4,712,967 | 12/1987 | Farthing ................................. 414/563 |
| 4,741,661 | 5/1988 | Carey ..................................... 414/563 |
| 4,795,303 | 1/1989 | Bubik ...................................... 414/478 |
| 4,797,058 | 1/1989 | Bilas ....................................... 414/563 |
| 4,798,509 | 1/1989 | Bubik ...................................... 414/563 |
| 4,815,915 | 3/1989 | Crupi, Jr. ................................ 414/563 |
| 4,836,737 | 6/1989 | Holmes et al. ......................... 414/563 |
| 4,871,291 | 10/1989 | Moore et al. ........................... 414/563 |
| 4,904,146 | 2/1990 | Lock et al. ............................. 414/563 |
| 4,927,315 | 5/1990 | Nespor ................................... 414/563 |
| 4,929,142 | 5/1990 | Nespor ................................... 414/563 |
| 4,986,720 | 1/1991 | Holmes et al. ......................... 414/563 |
| 5,061,147 | 10/1991 | Nespor ................................... 414/563 |
| 5,133,633 | 7/1992 | Grata ...................................... 414/477 |
| 5,205,700 | 4/1993 | Lin et al. ................................ 414/540 |
| 5,236,214 | 8/1993 | Taylor .................................... 280/402 |
| 5,326,216 | 7/1994 | Russ ........................................ 414/563 |
| 5,350,271 | 9/1994 | Weller .................................... 414/563 |
| 5,352,083 | 10/1994 | Roberts et al. ......................... 414/477 |
| 5,354,167 | 10/1994 | Cullum et al. .......................... 414/563 |
| 5,391,044 | 2/1995 | Young ..................................... 414/563 |
| 5,518,260 | 5/1996 | Grignon .................................. 280/402 |
| 5,560,628 | 10/1996 | Horn ....................................... 280/402 |
| 5,575,606 | 11/1996 | Kiefer et al. ........................... 414/563 |
| 5,607,279 | 3/1997 | Hill et al. ............................... 414/478 |
| 5,628,609 | 5/1997 | Nespor ................................... 414/563 |
| 5,672,042 | 9/1997 | Bartel .................................... 414/563 |
| 5,692,871 | 12/1997 | Nespor ................................... 414/563 |
| 5,722,810 | 3/1998 | Young et al. ........................... 414/563 |
| 5,762,465 | 6/1998 | Zackovich .............................. 414/563 |
| 5,908,280 | 6/1999 | Allison .................................. 414/563 |

*Primary Examiner*—Janice L. Krizek
*Attorney, Agent, or Firm*—Alfred M. Walker

[57] ABSTRACT

Wheel lift tow device for a tow truck includes a centrally located extendable support beam having a cross bar pivotably attached to it, so that it can be oriented obliquely for towing obliquely placed disabled cars. The telescoping slider arms of the cross bar provide lateral movement for a pair of swivel arm claws, or claws, which cradle and lift a pair of wheels of the disabled vehicle. The swivel arm scoops are rotatable about a pivot on each telescoping slider arm, but in their position of use are supported by a lateral stop bracket, which supports the lateral forces of the wheel while in the cradled position and distributes the weight therefrom.

20 Claims, 11 Drawing Sheets

Figure 14
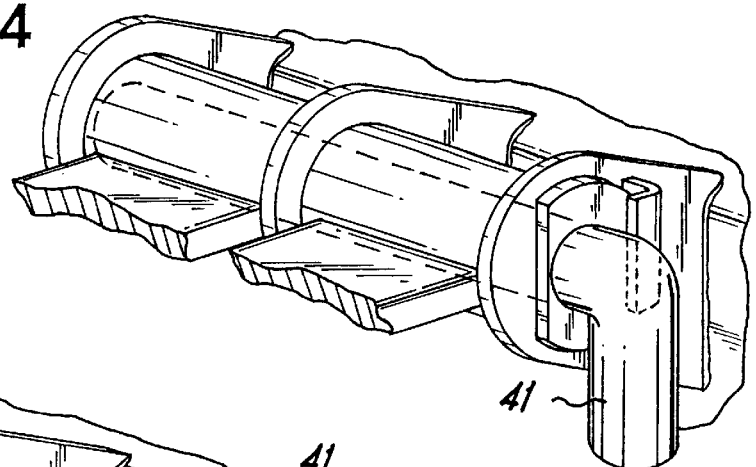
Figure 15
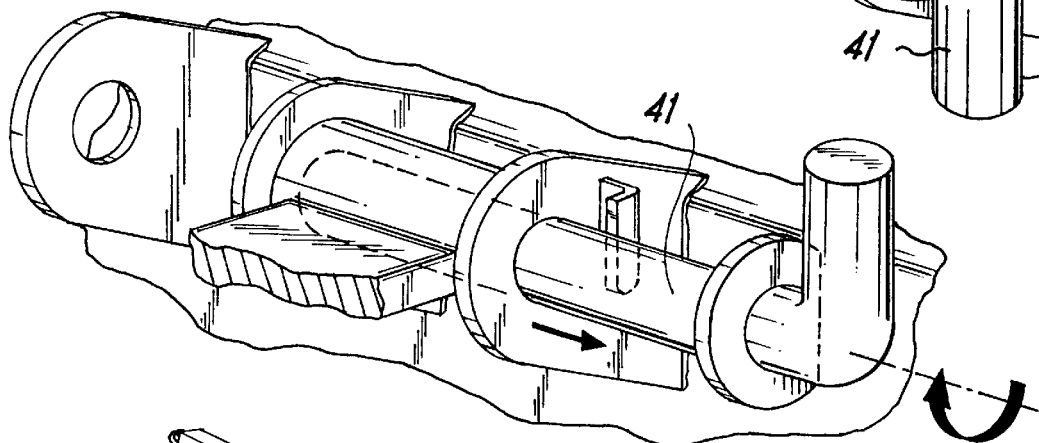
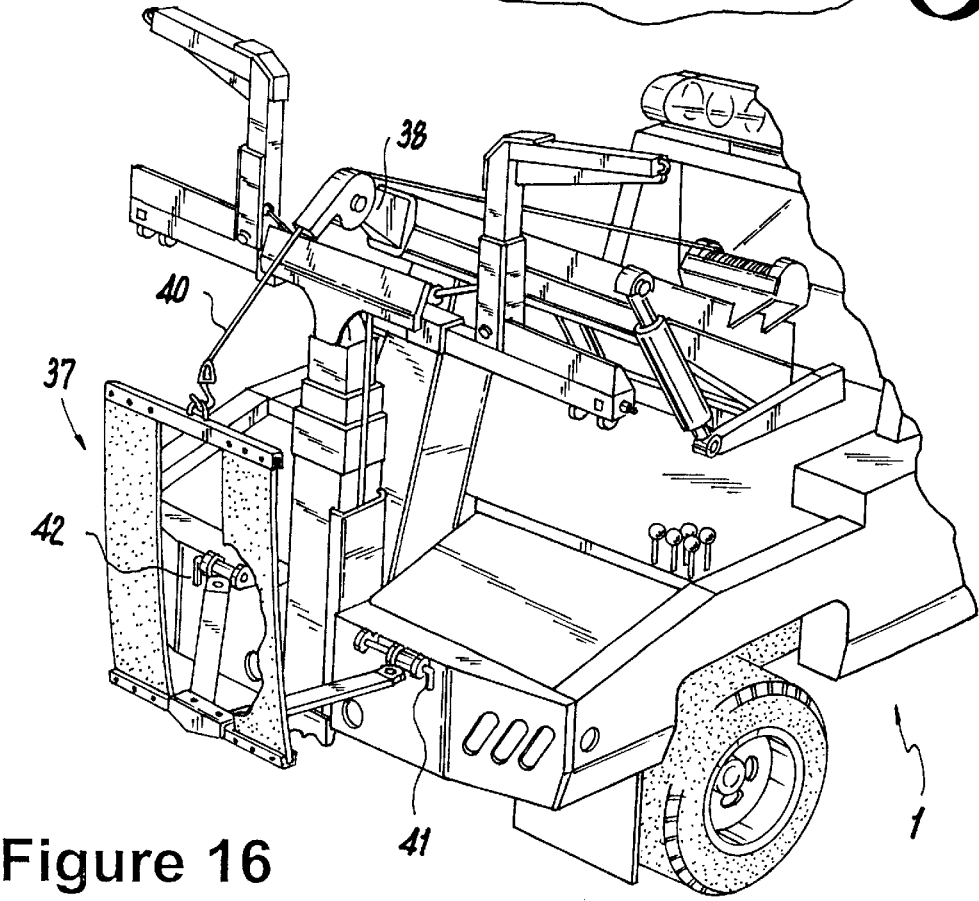
Figure 16

WHEEL LIFT WITH LATERALLY MOVABLE, ROTATABLE SWIVEL ARM WHEEL SCOOPS

FIELD OF THE INVENTION

The present invention encompasses a wheel lift for lowing vehicles, wherein the wheels are lifted by a pair of laterally movable and rotatable swivel arm scoops, or claws, as is known in the trade.

BACKGROUND OF THE INVENTION

The conventional technology either uses lateral movement of manually engageable claw arms, such as manufactured by Hy-Tech (also known as Hydra-Tech) or uses rotatable swivel arm claws, such as manufactured by Dynamic International Vulcan Equipment Co, Inc., and Jerr-Dan Corporation.

Other prior art includes U.S. Pat. No. 4,564,207 of Russ, dated Jan. 14, 1986, which describes a wheel lift device with rotatable L-shaped swivel arm claws, such as manufactured by Dynamic International, Inc. of Norfolk, Va. Furthermore, U.S. Pat. No. 5,326,216 also of Russ describes a swivelable wheel scoop, as does U.S. Pat. No. 5,722,810 of Young, et al, assigned to Jerr-Dan Corp.

In Russ '207, Russ '626, and Young et al '810, the cross beam does not move laterally perpendicular to the axis of the support beam extending out from the back of the tow truck. Moreover, the swivel arm claws are not tapered to be adjustable for various wheel base widths or for various sized vehicle tires. While the swivel arm claws are pivotable, the piston guiding the swivel arm claw pivoting moves parallel to the axis of the transverse cross bar.

Moreover, U.S. Pat. No. 4,473,334 of Brown describes rotatable wheel lift claws, similar to those of Dynamic or Century Wreckers.

U.S. Pat. No. 5,692,871 of Nespor, dated Dec. 2, 1997, and assigned to Chevron, Inc. describes a chain movable rotatable swivel arm scoop, wherein the tires of the vehicle are held adjacent to the proximal portion of the swivel arm scoop adjacent to the cross beam. In Nespor '871 the chain moves about a sprocket, and the swivel arm scoops do not move laterally outward and inward parallel to the axis of the cross beam. Nespor '871 does not provide an auxiliary brace to distribute the heavy weight of a towed vehicle against the pivotable swivel arm scoop.

U.S. Pat. No. 4,929,142 of Nespor describes a tilting vehicle carrier, U.S. Pat. No. 5,061,147 also of Nespor describes a wheel lift brace, U.S. Pat. No. 4,927,315 also of Nespor describes a boom retracting device for a wheel lift and U.S. Pat. No. 5,628,609 also of Nespor shows manually rotatable L-shaped wheel scoops attached to a transverse cross beam.

U.S. Pat. No. 4,836,737 of Holmes describes a wheel lift tow assembly with manually insertable L-shaped wheel scoops, U.S. Pat. No. 4,986,720 also of Holmes describes quick connect wheel cradles with a safety feature to prevent dislodging during towing of a disabled vehicle, and U.S. Pat. No. 4,679,978 also of Holmes, also describes a wheel lift tow assembly with manually insertable L-shaped wheel scoops.

Other Patents include U.S. Pat. No. 4,871,291 of Moore for a wheel lift with manual arm scoops and U.S. Pat. No. 4,904,146 of Lock also for a wheel lift with manual arm scoops.

U.S. Pat. No. 3,620,393 of Bubik describes a tow bar assembly, U.S. Pat. No. 4,637,623 also of Bubik discloses a wheel lift, U.S. Pat. No. 4,795,303 also of Bubik describes a wheel lift which cradles wheels from below, U.S. Pat. No. 4,383,807 also of Bubik discloses a wheel lift sling assembly, U.S. Pat. No. 4,798,509 also of Bubik describes rotatable swivel arm scoops and U.S. Pat. No. 5,354,167 of Callum discloses underlift mechanisms. Design Pat. No. Des. 310,980 describes the exterior design of a towing vehicle body.

Further patents include U.S. Pat. No. 5,133,633 of Grabba for a flat bed tow truck, U.S. Pat. No. 5,672,042 of Bartel, which describes a wheel lift assembly, U.S. Pat. No. 4,239,275 of Horneys for a multi-vehicle tow truck, and U.S. Pat. No. 5,575,606 of Kiefer which describes a wheel lift with apparently manually rotatable scoop arms.

U.S. Pat. No. 4,678,392 of Capers describes a wheel lift with wheel scoops which respond to movement of the wheel upon contact.

U.S. Pat. No. 5,518,260 of Grignon discloses a wheel lift with movable jaws, but wherein the vehicle is movable for a short distance within a garage upon rollers.

U.S. Pat. No. 4,573,857 of Porter describes a wheel lift with lockable wheel support members.

U.S. Pat. No. 4,712,967 discloses a dolly type car carrier and U.S. Pat. No. 4,586,866 of Kvamme, describes a wheel lift with manual wheel supports.

U.S. Pat. No. 4,741,661 of Carey describes manual L-shaped scoop assemblies, U.S. Pat. No. 5,236,214 of Taylor describes improvements to the boom of an underlift assembly, U.S. Pat. No. 4,451,193 of Cannon discloses a boom supported wheel lift carrier, U.S. Pat. No. 5,560,628 of Horn describes a vertically movable towing assembly and U.S. Pat. No. 5,205,700 of Lin describes a hoist mechanism for a vehicle carrier.

Other patents include U.S. Pat. No. 5,350,271 of Weller for a wheel lift with swivel arm scoops which are rotatable by the force of cylinders and levers. In Weller '271 the swivel arm scoops are not laterally movable. Moreover, each swivel arm scoop is L-shaped but with no taper to accommodate various wheel sizes. In addition, in a position of rest the cross beam with the swivel arm scoops thereon sticks out from the end of the tow truck, which is a safety hazard.

U.S. Pat. No. 5,391,044 of Young describes a wheel lift with non-rotatable L-shaped wheel scoops, U.S. Pat. No. 5,352,083 of Roberts describes a wheel lift with non-rotatable L-shaped scoops having swivelable tire engaging portions, U.S. Pat. No. 4,384,817 of Peterson describes a frame mounted vehicle lift assembly and U.S. Pat. No. 4,797,058 of Bilas describes a wheel lift assembly.

Furthermore, U.S. Pat. No. 4,632,629 of Kooima describes a wheel lift with laterally movable but otherwise stationary U-shaped wheel scoop jaws. U.S. Pat. No. 4,557,496 of Sill, also describes a wheel lift with laterally movable but otherwise stationary U-shaped wheel scoop jaws, and U.S. Pat. No. 4,534,579 of Shackleford discloses a wheel lift assembly with pivotable wheel engaging fork members. U.S. Pat. No. 4,473,237 of Lind discloses a wheel lift which includes square shaped members which have to be inserted under the wheels when the vehicle frame is first lifted otherwise.

In addition U.S. Pat. No. 4,034,873 of Haring describes a sling apparatus with manually installable wheel cradle scoops, U.S. Pat. No. 3,667,630 of Scott discloses a vehicle tow assembly with lockable wheel engaging members, U.S. Pat. No. 3,719,294 of Aquilla describes a vehicle tow assembly, U.S. Pat. No. 4,149,643 of Skala describes a truck tow lift which engages the truck frame, U.S. Pat. No. 5,607,279 of Hill describes a flat bed tow truck with a hoist mechanism and U.S. Pat. No. 4,815,915 of Crupi describes an auxiliary tow for a truck which tows a vehicle by engaging its frame.

Moreover, U.S. Patent Nos. 3,434,607 and 3,434,608 of Nelson describe stationary wheel lift assemblies. However the prior art does not describe a wheel lift device having a pair of hydraulically rotatable swivel arm scoops which support the wheels of a disabled vehicle, wherein the swivel arm scoops are also laterally movable parallel to the axis of a cross beam extending transverse to the longitudinal axis of the tow truck itself.

None of the patents cited above have cross bar slider arms that automatically move laterally perpendicular to the axis of the support beam extending out from the back of the truck at the same time that tapered wheel lifting claws are hydraulically activated.

OBJECTS OF THE INVENTION

It is an object of the present invention to provide a wheel lift tow device with a centrally located extendable support beam having a telescoping cross beam pivotably attached to it, so that it can conveniently tow disabled cars.

It is another object to provide a wheel lift tow device with lateral movement for a pair of swivel arm scoops, or claws, which cradle and lift a pair of wheels of the disabled vehicle.

It is another object to provide a wheel lift tow device which supports the lateral forces of the wheel while in the cradled position and distributes the weight therefrom.

It is another object to provide a wheel lift tow device that has automatic laterally movable cross bar slider arms that can engage a tire sidewall and automatically stop, thus allowing the second cross bar slider arm to extend further and seek out the remaining tire of a non-centered disabled vehicle.

It is yet another object to provide a wheel lift tow device which prevents damage to the oil pan of the disabled vehicle and to the wheel lift device itself.

It is yet another object to provide a wheel lift tow device which accommodates vehicles with various sized wheels and wheelbases, without utilizing portable adapters.

It is yet another object to insure that the swivel arm claw of the wheel lift tow device stays in place while towing a disabled vehicle.

It is yet another object to provide a wheel lift tow device, which accommodates smooth movement in its longitudinal movement away from a tow truck body.

It is yet another object to provide a wheel lift tow device, which enables a tow truck to alternatively use a conventional tow bar with sling and toggle for heavier disabled vehicles when use of a wheel lift is contraindicated.

It is yet a further object to improve over the disadvantages of the prior art.

SUMMARY OF THE INVENTION

In the present invention, a centrally located extendable support beam has a pivotably attached cross bar with telescoping slider arms, so that it can be oriented obliquely for towing obliquely placed disabled cars. The telescoping slider arms of the cross bar provide lateral movement for a pair of swivel arm scoops, or claws, which cradle and lift a pair of wheels of the disabled vehicle.

The swivel arm claws are rotatable about a pivot adjacent to the telescoping swivel arms of the cross bar, but in their position of use are supported by a lateral stop bracket, which supports the lateral forces of the wheel while in the cradled position and distributes the weight therefrom.

The swivel arm claws are powered by hydraulic cylinders, which are placed forward of the telescoping cross beam, but are protected between upper and lower plates to prevent damage to the oil pan of the disabled vehicle and to the cylinders themselves. By "forward" the term means the distal outer portion of the tow device closest to the disabled vehicle. Therefore, the "forward" position is behind the "rearward" position with respect to the actual front of the tow truck. Preferably, to accomplish both lateral and rotatable movement of each swivel arm claw each hydraulic cylinder moves obliquely with respect to the longitudinal axis of the cross bar, to push each swivel arm claw outward as the cylinder rotates each swivel arm claw.

The cross bar swivel pin is a hollow threaded bolt, to facilitate the distribution of grease therebetween.

Alternatively, the hydraulic cylinders can be located rearward of the cross bar, i.e. away from the distal outer position of the tow device closest to the disabled vehicle.

To accommodate vehicles with various sized wheels and wheel bases, the distal end member of the V-shaped swivel arm claw is tapered in shape, and extends at a tapered obtuse angle from the proximal end arm of the claw, which proximal arm is pivotably attached adjacent to the respective telescoping swivel arm of the cross bar.

To insure that the swivel arm claw stays in place before being extended laterally out from the central pivot of the cross beam meeting the central support beam coming from the tow truck, a retaining means, such as an internally placed spring, is located within the hollow telescoping swivel arms of the cross bar.

Optionally another type of biasing means can be used, such as another hydraulic cylinder.

Furthermore, the hydraulic hose has slack in its position of storage at rest, to accommodate smooth movement of the telescoping support beam in its longitudinal movement away from the tow truck body.

Finally, in a position of rest, the wheel lift mechanism is lifted up by the pivoting of the central support beam, and the swivel arm claws are held at an angle, so that there is a space between them for movement of the conventional telescopic wrecker crane boom extension therebetween. This enables the tow truck to alternatively use a conventional tow bar with sling for heavier disabled vehicles for which use of a wheel lift is contraindicated.

DESCRIPTION OF THE DRAWINGS

FIGS. 11, 12, 13, 14, 15 and FIG. 16 are close up perspective views of the hydraulic telescopic boom extension, anchor leg and alternate sling set up and deployment thereof.

DETAILED DESCRIPTION OF THE PREFERRED EMBODIMENTS

Figure 1:
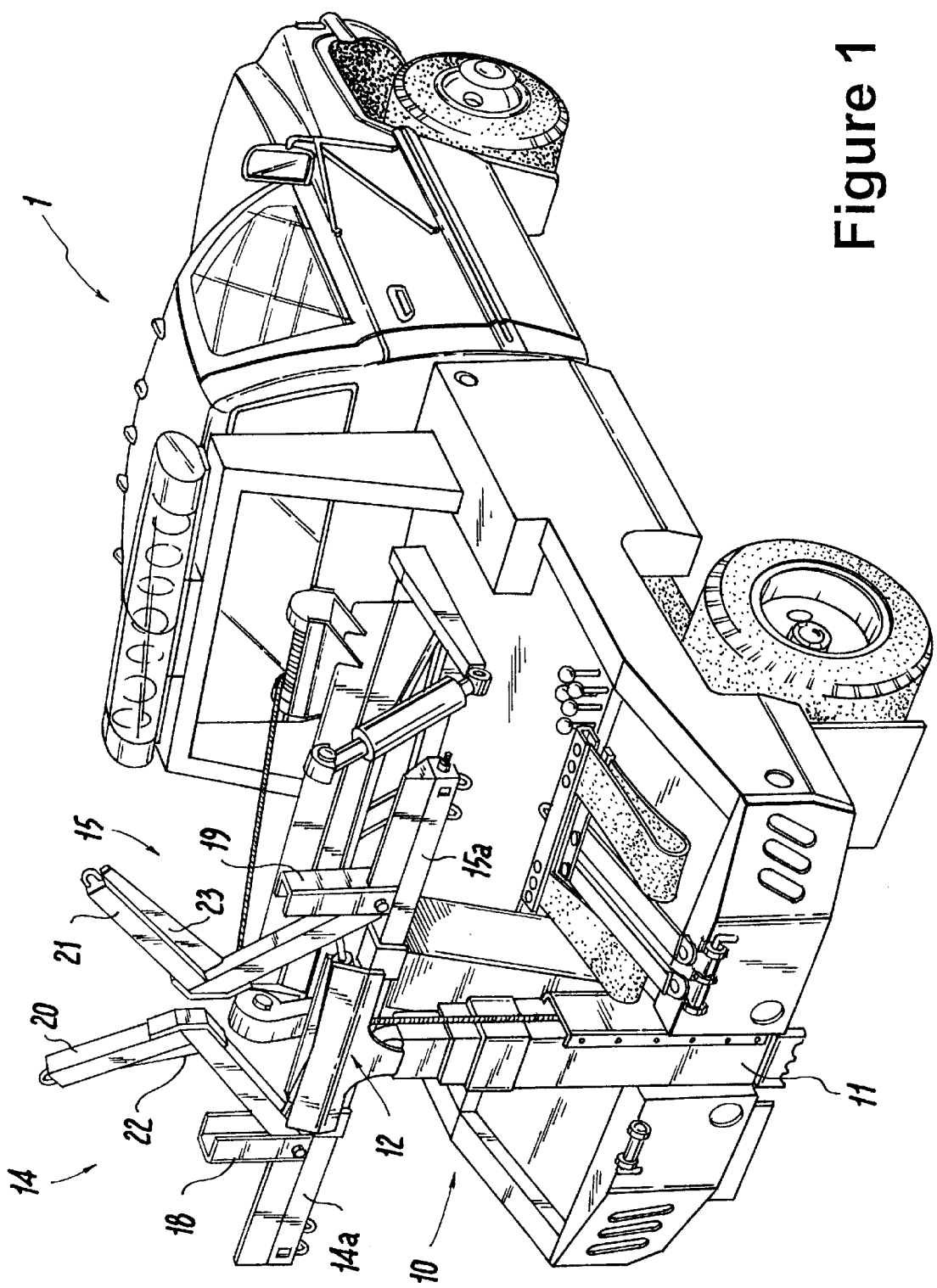
FIG. 1 is a rear perspective view of a wrecker type vehicle shown with the present invention in a boom up stored travel position.

FIG. 1 shows a wrecker truck 1 having the wheel lift mechanism 10 of the present invention which includes a telescoping central support beam, such as probe extension arm 11, slidably attachable to yoke portion 12, wherein yoke portion 12 has extending laterally on both sides wheel lifts 14, 15. Each wheel lift 14 or 15 includes at least one laterally movable telescoping slider arm, such as a pair of laterally movable telescoping slider arms, such as hollow slider arms 16, 17, having extending therefrom a claw support, such as open support bracket 18, 19 holding a swivelable arm tire engaging claw, such as pivotable angled claw member 20, 21.

Claw arm members 20, 21 each include a tire engaging portion, such as distal tire plates 22, 23, which are preferably upwardly slanting and basically triangular in configuration. Therefore, the actual angle of each claw member 20, 21 does not have a perpendicular "L" shape, but rather an oblique angled shape for securing each claw member 20, 21 underneath each respective vehicle tire of the vehicle to be towed. Each distal tire plate 22, 23 is preferably slanted, wherein proximal portions 20a, 21a of each claw arm number 20, 21 are attached to the laterally movable slider arms, such as hollow slider arms 16, 17, by pins 24, 25, although other fastenings may be used.

The purpose of each claw support, such as claw brackets 18, 19 is to provide further support when each claw arm member 20, 21 is in the extended position engaging with each respective tire of the vehicle to be towed.

Claw members 20, 21 are moved by a force importing mechanism, such as a pair of hydraulic cylinders 27, 28, having respective piston rods 27a, 28a therein, namely, upper hydraulic cylinder 27, and lower hydraulic cylinder 28, which are basically kept from damage by being placed between upper and lower cover plates 12a, 12b over yoke 12. Preferably upper cover plate 12a is inserted into cross bar 12d or swivel pad 12e of yoke 12 by a fastener, such as threaded zerked grease fitting swivel bolt 12c, to facilitate rotational movement of wheel lift mechanism 10. Probe extension arm 11 may have attached to it force imparting connectors, such as hydraulic lines 26a, 26b for providing compression for force imparting mechanisms, such as hydraulic cylinders 27, 28.

Figure 4:
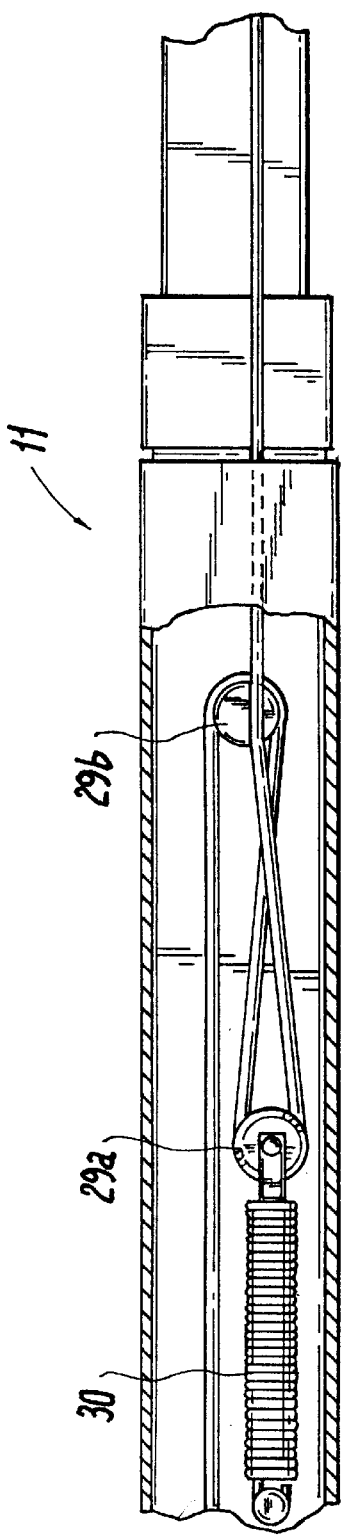
FIG. 4 is a side elevational view of the hose slack adjuster portion of the present invention.
Figure 5:
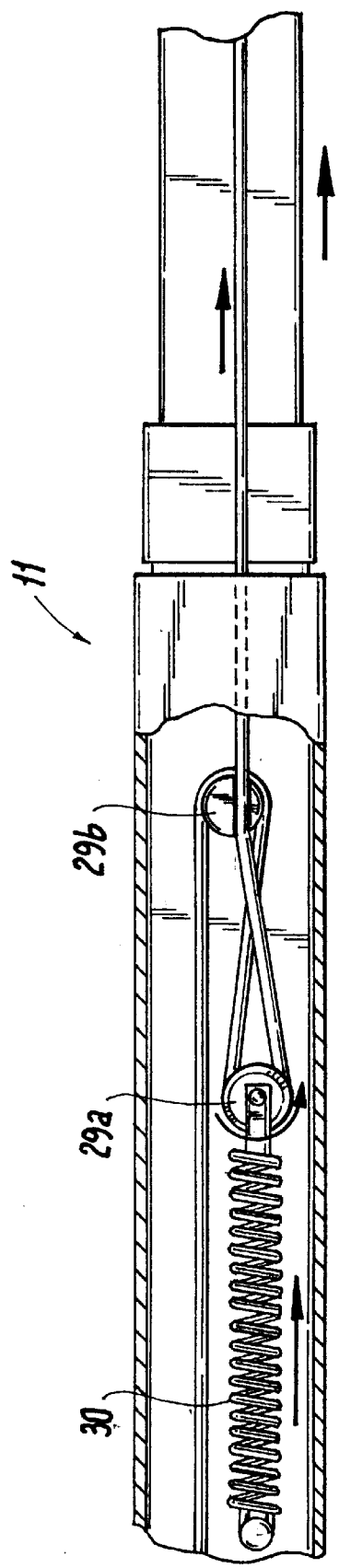
FIG. 5 is a side elevational view of the hose slack adjuster as in FIG. 4, shown in an extended position with arrows indicating the direction of extension.
Figure 6:
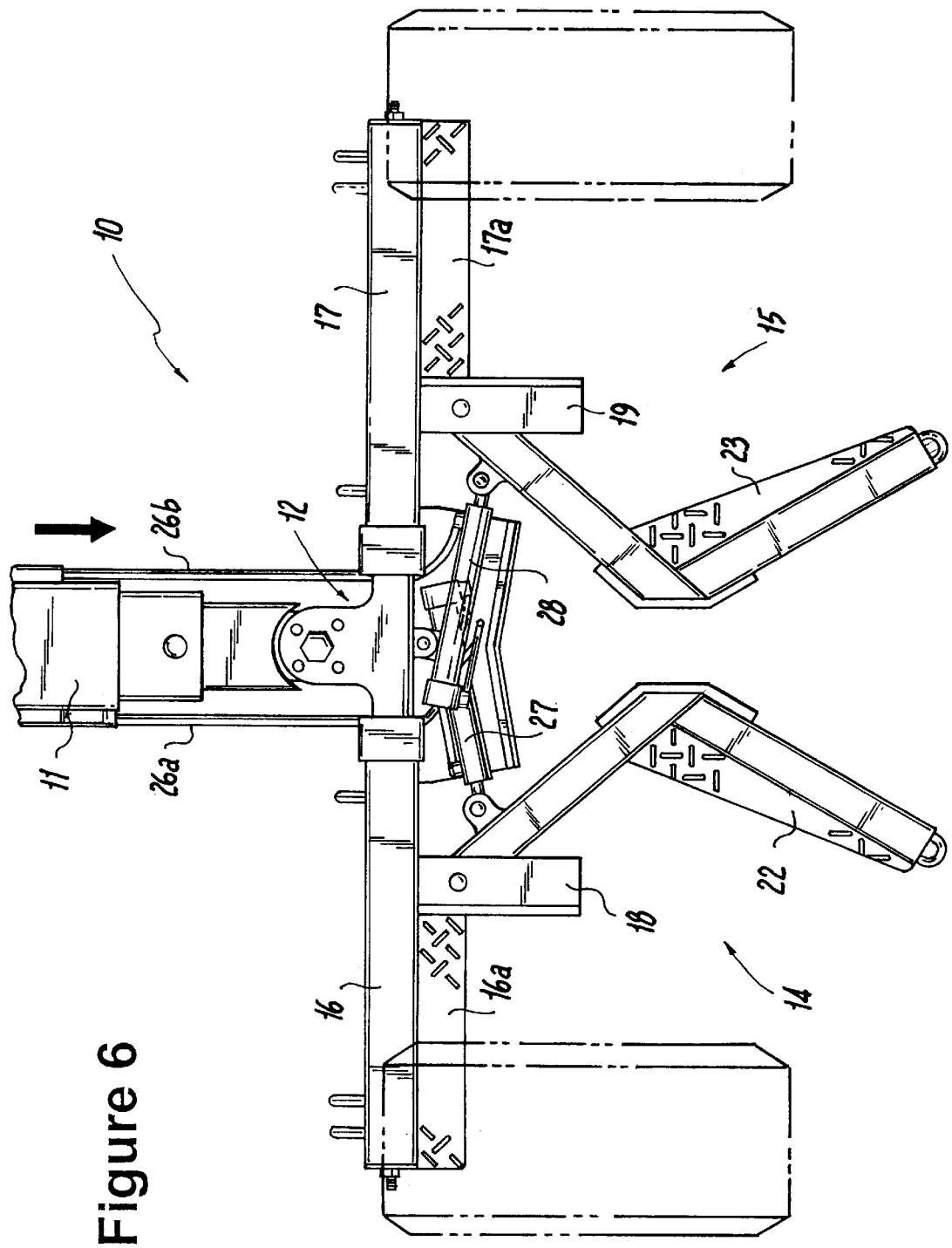
FIG. 6 is a top plan view of the wheel lift of the present invention shown in an undeployed position, wherein tires to be engaged are shown in dotted lines for environmental purposes only.

Hydraulic lines 26a, 26b may have a slackening mechanism as shown in FIGS. 4 and 5, so that they can smoothly move. Each slackening mechanism includes a pair of pulleys 29a, 29b, wherein one pulley 29a is attached to a coil spring 30, which coil spring 30 is then further attached to extension probe arm 11.

There are further lateral tension members, such as coil springs 31, 32 which are attached within each hollow slider arm 16, 17 of wheel lifts 14, 15, to facilitate the lateral movement of claws arm members 20, 21 and provide tension therewith. Each lateral coil spring 31, 32 is preferably attached by threaded hook 33, 34 to a respective end plates 35, 36 wherein each respective end plate 35, 36 is welded to respective hollow slider arms 16, 17 of wheel lifts 14, 15.

To further hold the tires, each hollow slider arm 16, 17 contains a respective oblique slanted portion 16a, 17a, slanting up from the horizontal, from the ground level, to the top of each hollow slider arm 16, 17 to prevent forward movement of the tire. Optionally, each oblique slanted portion 16a, 17a can be advanced forward from each hollow slider arm 16, 17 by a spacer (not shown) between same so that yoke portion 12 does not engage an oil pan of the vehicle being towed.

As also shown in FIG. 1, probe extension arm 11 is shown in stored travel position. When probe extension arm 11 is lowered to a vehicle engaging position as in FIG. 2, claw arm members 20, 21 are rotated as indicated by the arrows "A", "B". Furthermore, yoke 12 is pivotably movable clockwise or counter clockwise, as indicated by arrow "C", to facilitate oblique mounting of a set of vehicle tires upon wheel lifts 14, 15.

Figure 2:
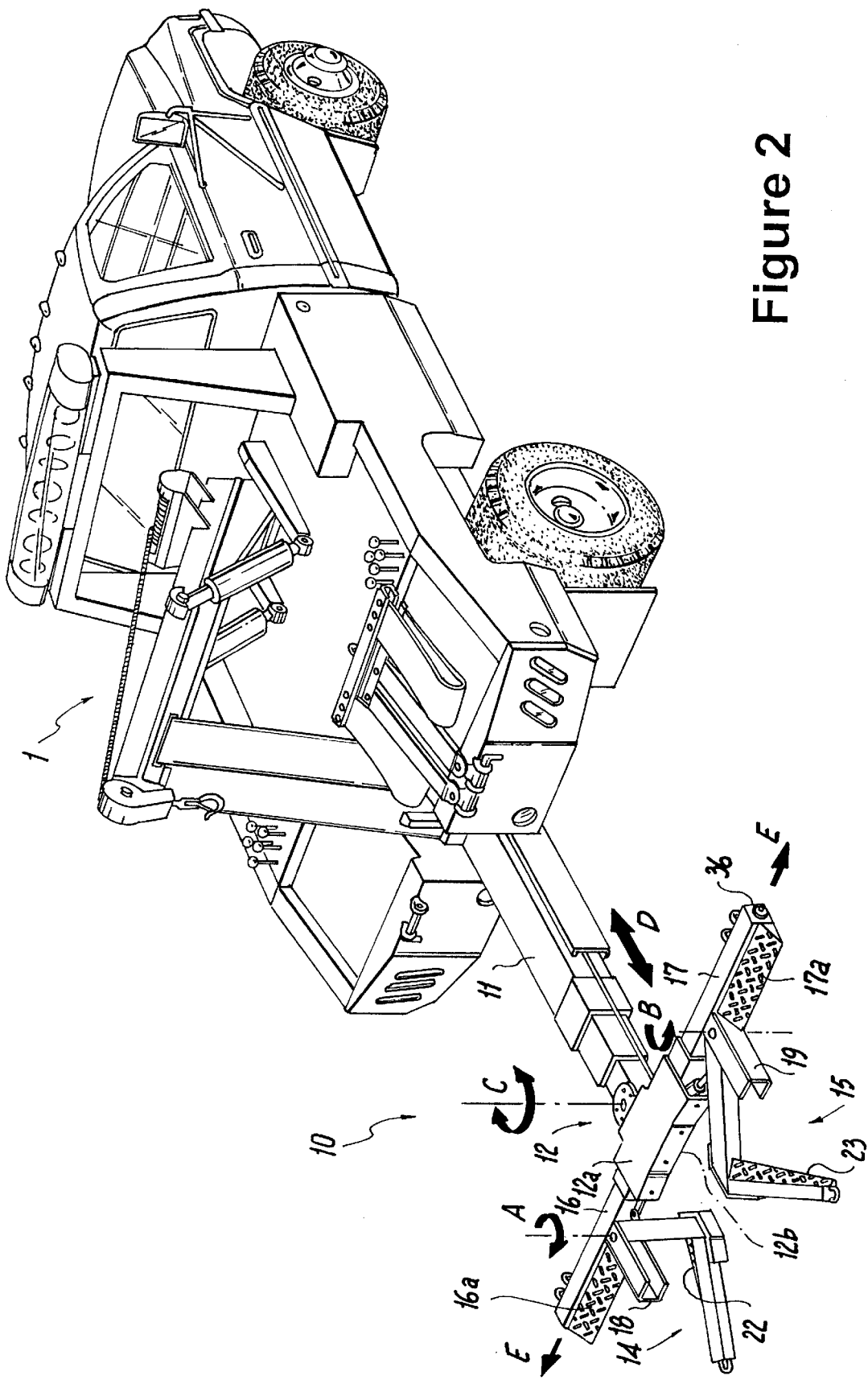
FIG. 2 is rear perspective view as in FIG. 1 in a boom down position, wherein the range of motion is shown in phantom of the lateral movements of the wheel pick up elements.
Figure 3:
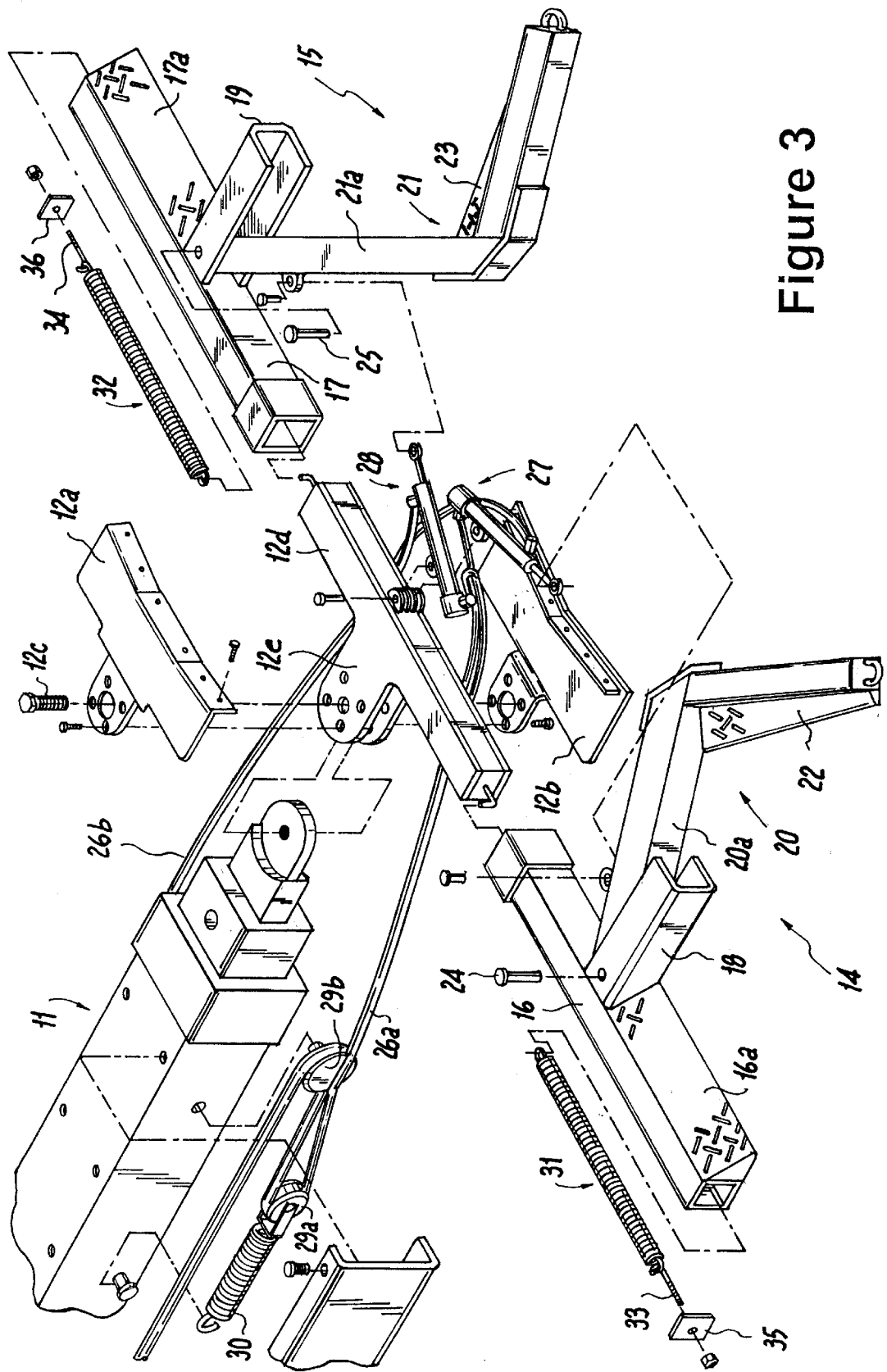
FIG. 3 is an exploded perspective view of the components of the wheel lift of the present invention.

FIG. 2 also shows directional arrow "D" to indicate the linear "in and out" movement of probe extension arm 11, to move wheel lifts 14, 15 underneath the tires of a vehicle to be towed. FIG. 2 also shows directional arrows "E" to indicate the lateral sideways "in and out" movement of hollow slider arms 16, 17.

FIGS. 6–9 show the movement of claw arm members 20, 21, wherein claw arm members 20, 21 are first pivoted and then moved in place against the tire.

Figure 7:
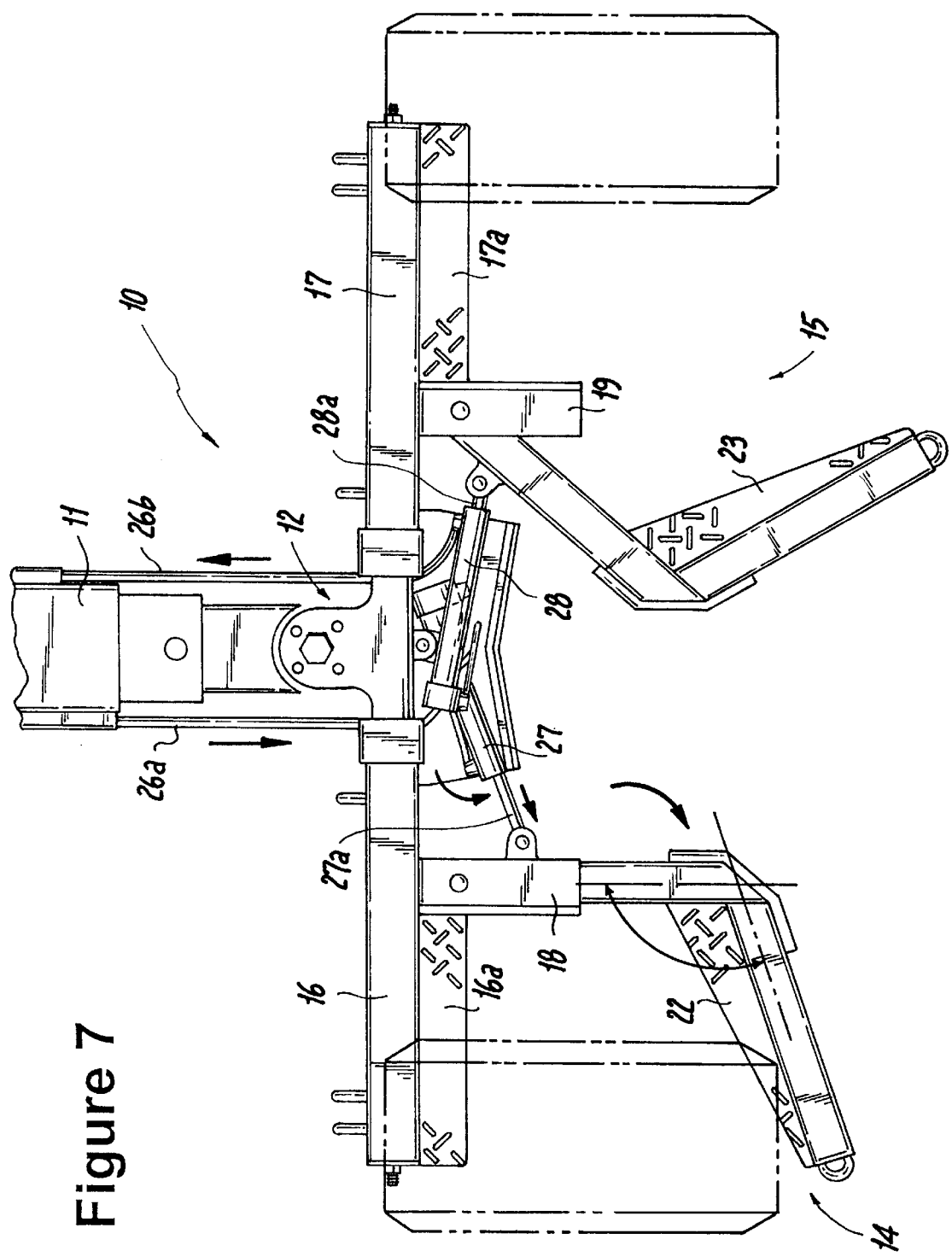
FIG. 7 is a top plan view of the wheel lift of the present invention wherein the left claw portion is shown pivoting as indicated by the arrows therein.
Figure 8:
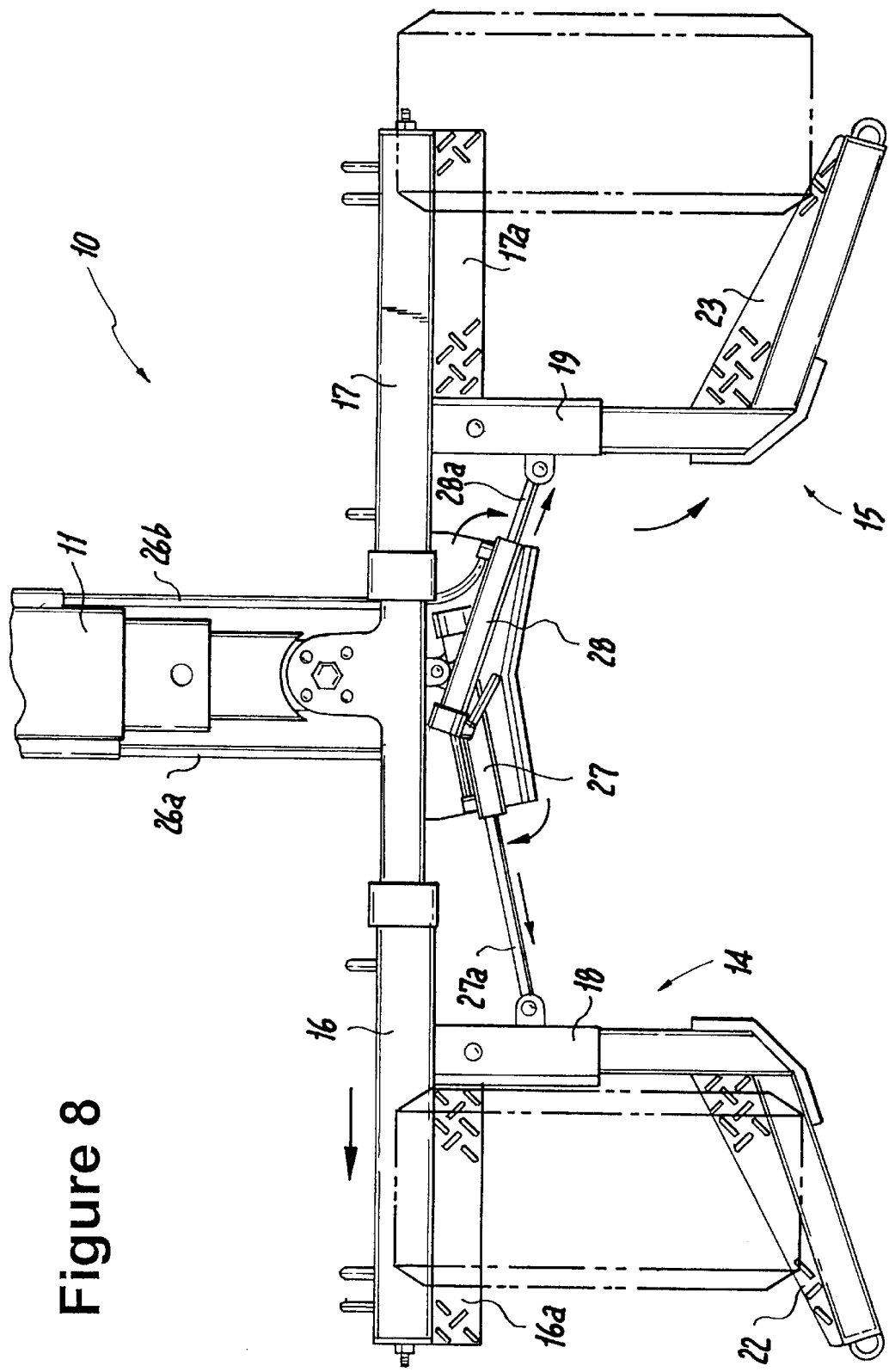
FIG. 8 is a top plan view of the wheel lift of the present invention wherein the left claw is shown deployed to the tire and the right portion is shown pivoting before engagement.

FIGS. 7 and 8 further show piston rods 27a, 28a of hydraulic cylinders 27 and 28, each movable independently of each other so that respective distal tire plates 22 and 23 of respective claw members 20 and 21, engage tires of the disabled vehicle. As also shown in FIG. 8, hydraulic cylinders 27, 28 engage respective tires of the disabled vehicle.

As also shown in FIG. 8, hydraulic cylinder piston rods 27a and 28a can stop independently of each other when each hydraulic cylinder piston rod 27a or 28a engages a respective tire of the disabled vehicle, as the respective telescoping slider arms 16, 17 move laterally outward. This results in the disparate extension lengths of hydraulic cylinder piston rods 27a, 28a shown in FIG. 8.

Figure 9:
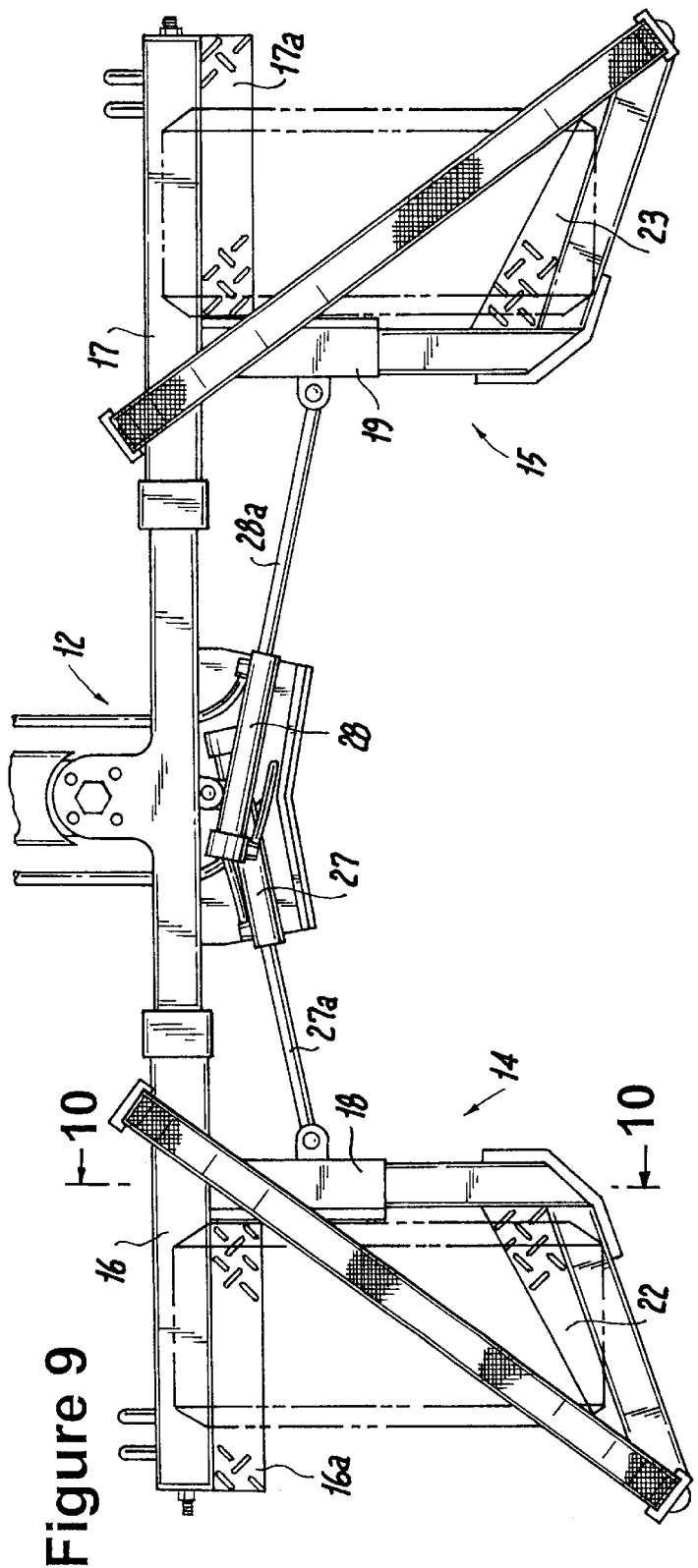
FIG. 9 is a top plan view showing the left claw contacting the tire and the right claw contacting the other tire, wherein portable wheel restraint straps are shown in place.
Figure 10:
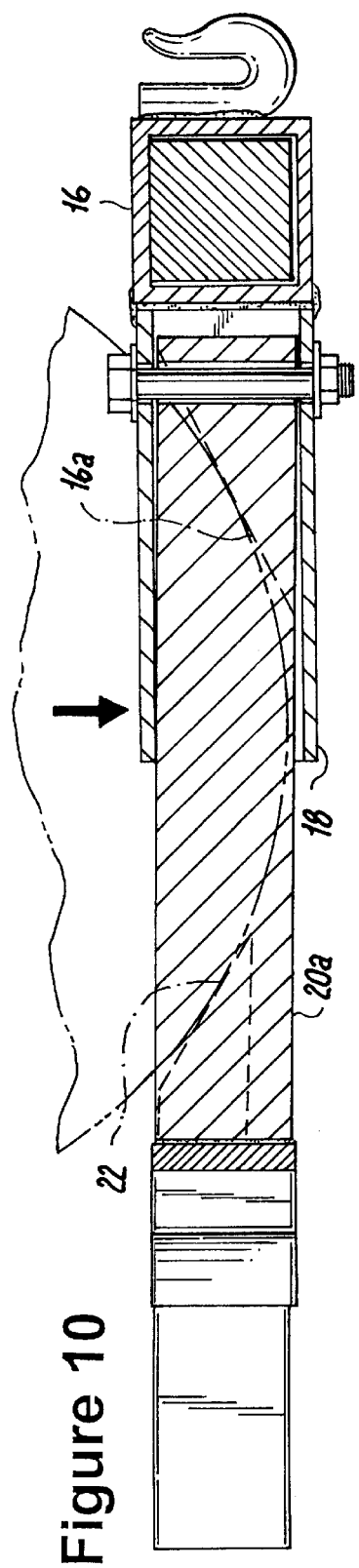
FIG. 10 is a close up cross sectional view of the right claw contacting a tire, taken along lines 10-10 of FIG. 9.

As shown in FIG. 9, the safety straps are manually applied for additional safety.

Figure 11:
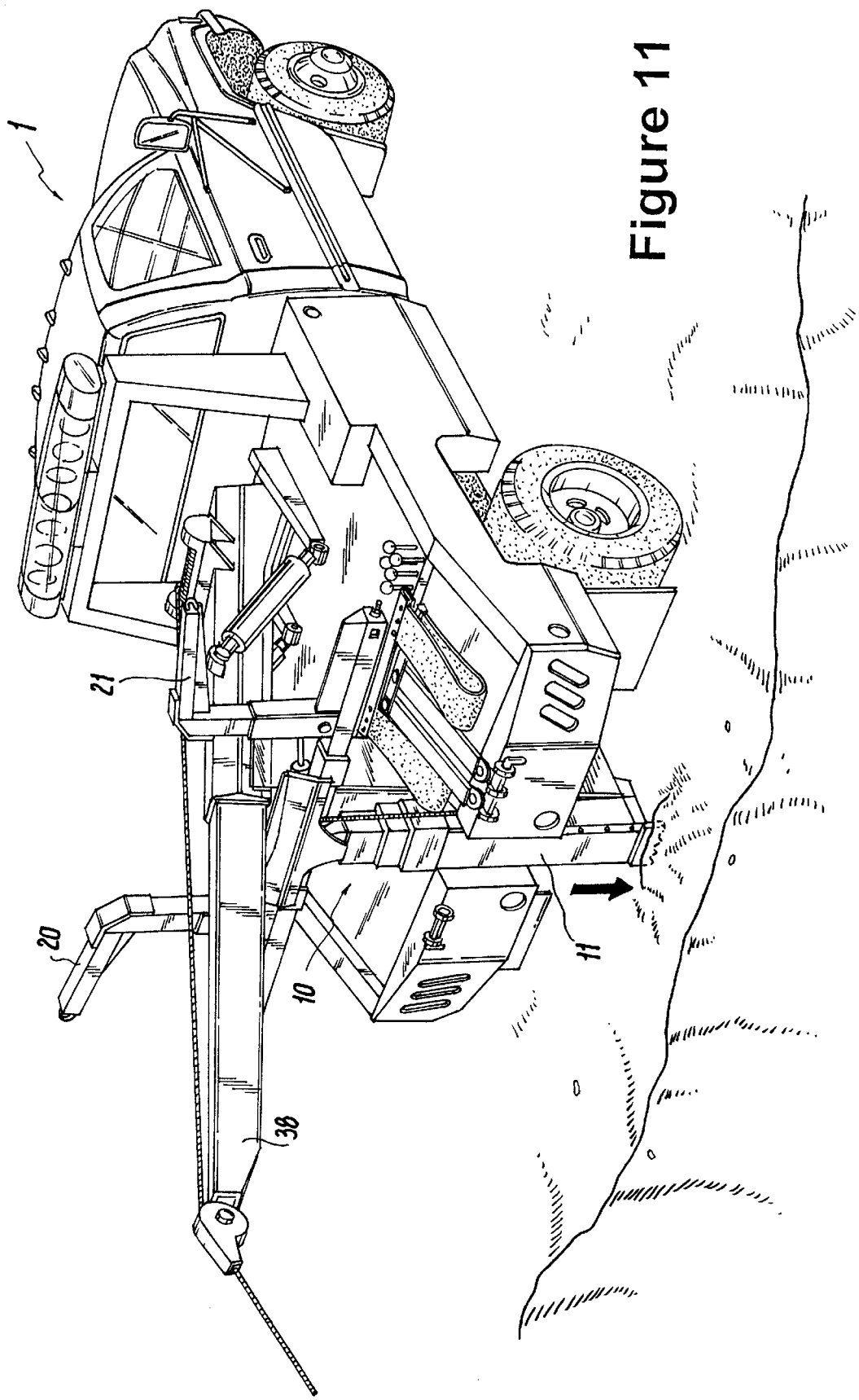
Figure 12:
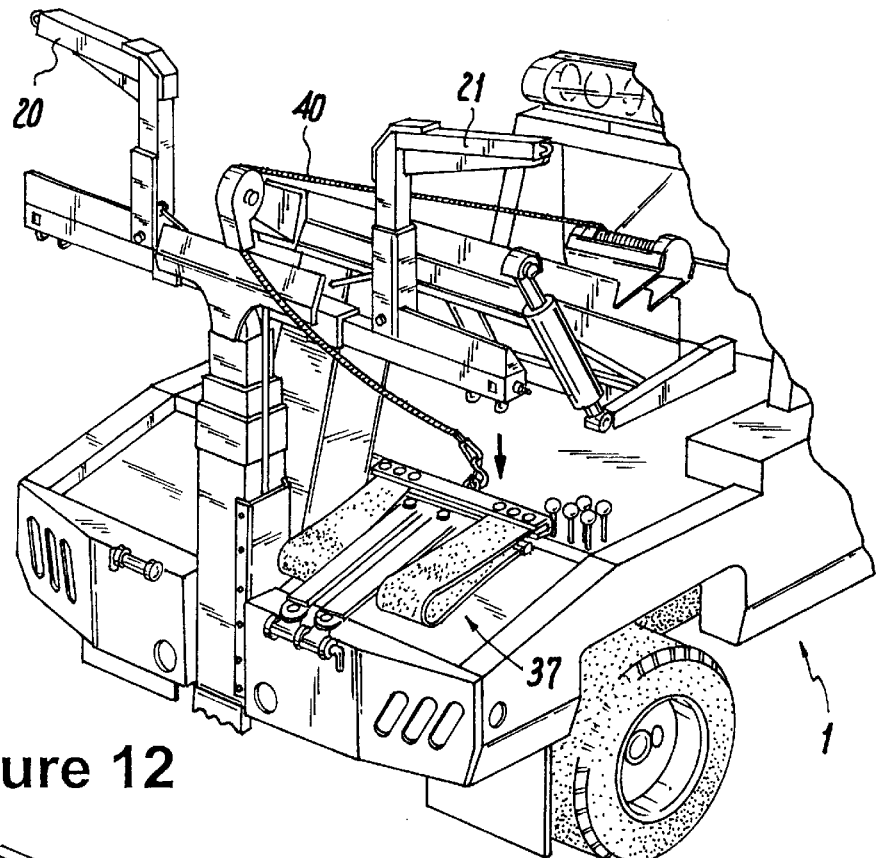
Figure 13:
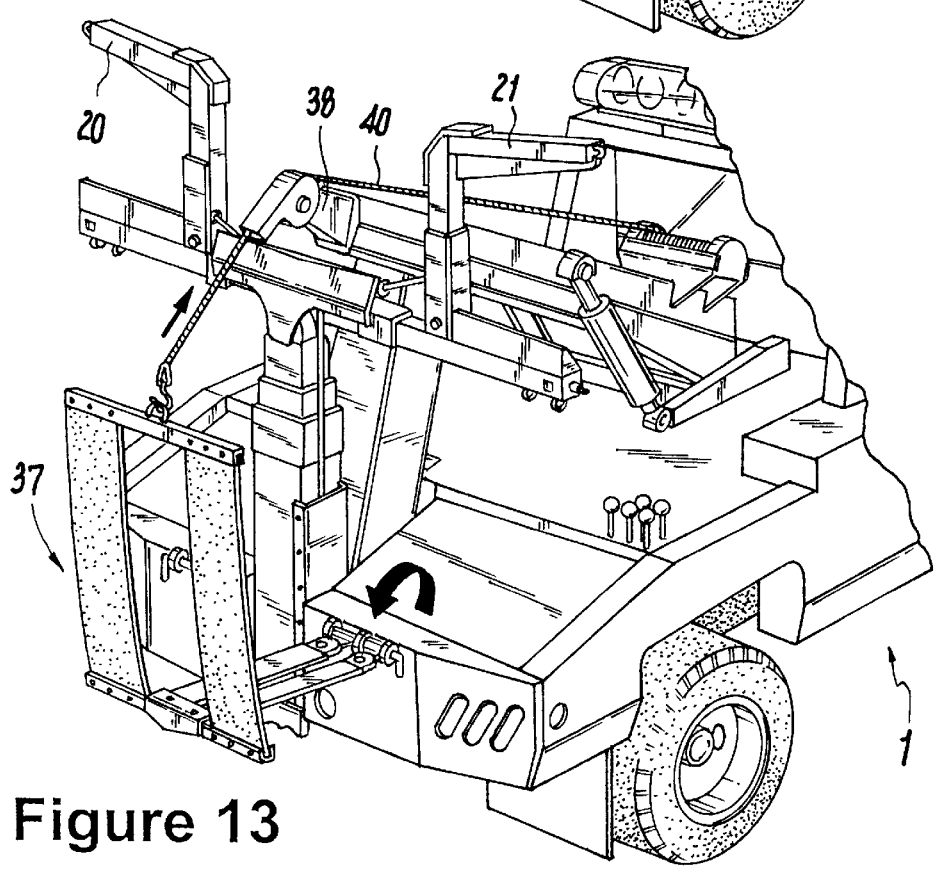

In FIG. 11 there is shown hydraulic telescopic wrecker crane boom extension 38 for vehicle retrieving purposes. When wrecker crane boom extension 38 is used, then wheel lift apparatus 1 can be lowered in its vertical stored position to the ground, so that the anchor plate at a rear portion of probe extension arm 11 contacts and anchors to the ground for stability.

Even as claw arm members 20, 21 are stored vertically in the retracted position, as in FIG. 1, then boom extension 38 can move freely therebetween.

In FIGS. 12–16 there is shown an alternate sling apparatus 37 supported by a conventional telescopic wrecker crane boom extension extending upward for the tow truck body of tow truck 1 attached to the truck vehicle 1 which can be used for heavier lifts with a conventional hook up.

FIGS. 14 and 15 show the further details close up views of the sling deployment mechanism. Sling apparatus 37 attached to the deck of the vehicle 1 by attaching winch cable 40. By partially extending wrecking crane boom 38 between and through stored claw arm members 20, 21, winch cable 40 can then be attached to tow sling apparatus 37 normally stored on the wrecker body deck.

In FIGS. 14, 15 by partially releasing the tension lock pin 41, one arm of the sling apparatus 37 will be released and freely extended to opposite bracket 42, without wheel lift apparatus obstructing the use of the sling apparatus 37.

It is further noted that other modifications may be made in the present invention without departing from the scope of the invention, as noted in the appended Claims.

I claim:

1. A wheel lift tow device of a tow truck to tow a vehicle comprising:
    a centrally located extendable support beam having a free end to which is attached a cross bar,
    said support beam attached to said cross bar at a location between free ends of said cross bar,
    said cross bar having a pair of slider arms extending outwardly from the free ends of said cross bar and telescoping laterally relative to the free ends of said cross bar,
    each slider arm having a forwardly directed portion adapted to engage corresponding under sides of a pair of wheels on the vehicle to be towed,
    a claw extending in a forwardly direction from each of said slider arms, and
    each said claw being mounted on and rotatable about respective pivots on said telescoping slider arms so that said claws may be moved laterally in opposite directions to adjust the distance between said claws and pivoted so as to engage the undersides of said pair of wheels on sides opposite from that engaged by the forwardly directed portions of said slider arms, thereby cradling said pair of wheels for lifting said vehicle,
    wherein movements of said claws are powered by at least one hydraulic cylinder.

2. The wheel lift tow device as in claim 1 wherein said centrally located extendable support beam includes a hydraulic telescoping probe extension arm; said hydraulic telescoping probe extension arm having an outer sleeve and a movable inner member.

3. The wheel lift tow device as in claim 1, wherein said claws are each supported by a lateral open support sleeve bracket when engaged with a wheel, said open support sleeve bracket supporting the lateral forces of the wheel of the vehicle while the wheels are in the cradled position and said open support sleeve bracket distributing the weight therefrom.

4. The wheel lift tow device as in claim 3, wherein each said telescoping laterally movable slider arm attached to said cross bar is hollow.

5. The wheel lift tow device in claim 3 in which the portion of each said claw engaging a wheel is tapered in shape, and extends at a tapered obtuse angle along a proximal end arm of each said claw to accommodate different wheel sizes.

6. The wheel lift tow device as in claim 3, wherein said centrally located extendable support beam has the cross bar pivotably attached to said centrally located extendable support beam, wherein said cross bar is pivotable in a horizontal plane for towing obliquely placed cars.

7. The wheel lift tow device as in claim 3, wherein in a vertical position of rest, said cross bar is lifted up by an upward pivoting of said support beam, wherein further in said vertical position of rest said slider arm claws are each held upward at an angle, with a space being provided between said slider arm claws.

8. The wheel lift tow device as in claim 7 wherein said central support beam is lowerable to the ground to anchor said vehicle in place.

9. The wheel lift tow device as in claim 3 wherein said lateral open support sleeve bracket supports each said claw in place after each said claw is rotated laterally to meet and engage said support sleeve bracket, and biasing means for insuring that said claw stays in place when engaging a wheel.

10. The wheel lift tow device as in claim 9, wherein said biasing means is a spring.

11. The wheel lift tow device as in claim 9 wherein said means is a hydraulically controlled piston.

12. The wheel lift tow device as in claim 3 wherein said claws are powered by respective independent hydraulic cylinders.

13. The wheel lift tow device as in claim 12, wherein said hydraulic cylinders for said claws are located between upper and lower plates to prevent damage to the oil pan of the vehicle and to said cylinders.

14. The wheel lift tow device as in claim 13, wherein said cross bar and said support beam are connected by a hollow threaded screw, to facilitate the distribution of grease therebetween.

15. The wheel lift tow device as in claim 3, wherein said hydraulic cylinders are connected to a hydraulic power source by a hydraulic hose having slack in a position of storage at rest, to accommodate smooth movement of said telescoping slider arms in their respective laterally telescoping movements.

16. The wheel lift tow device as in claim 12 wherein said hydraulic cylinders have respective piston rods, wherein each said respective piston rod stops independently of the other piston rod while each said claw makes separate contact with a respective wheel.

17. A wheel lift tow device of a tow truck to tow a vehicle comprising:
    a centrally located extendable support beam having a cross bar pivotably attached thereto at a location on said cross bar between a pair of free ends,
    said cross bar having a pair of telescoping slider arms movable outwardly with respect to the free ends of said cross bar and adapted to engage corresponding undersides of a pair of wheels on the vehicle to be towed,
    each slider arm having pivotably mounted thereon a rotatable claw;
    each said claw having a portion thereof adapted to engage the underside of one of said wheels on said vehicle on a side opposite from that engaged by said slider arms and being movable between a first position where said portion is retracted away from said wheels and a second position where said portion engages one of said wheels, and
    each said claw having a lateral open support sleeve bracket for providing sufficient additional support to said claws to lift said vehicle when said claws are moved into said second position,
    wherein movements of said claws are powered by at least one hydraulic cylinder.

18. The wheel lift tow device as in claim 17 wherein each said claw includes a slanted wheel engaging edge to automatically accommodate various sized wheels.

19. The wheel lift tow device as in claim 18 wherein said slanted wheel engaging edge is spaced from said slider arm.

20. A method of lifting one end of a four wheeled vehicle comprising the steps of:

placing an end of a centrally located extendable support beam adjacent an end of said vehicle to be lifted, said support beam having a free end to which is attached a cross bar, said support beam attached to said cross bar at a location between free ends of said cross bar, said cross bar having a pair of slider arms extending outwardly from the free ends of said cross bar and said slider arms telescoping laterally relative to respective free ends of said cross bar, each slider arm having a claw pivotally mounted at one end on said slider arm, at least one hydraulic cylinder for advancing said cross bar until each said slider arm of said pair of slider arms makes contact with one side each of two adjacent wheels on said vehicle, using said at least one hydraulic cylinder for rotating said claws until said claws extend on the side of said two adjacent wheels opposite that of said slider arm, using said at least one hydraulic cylinder for retracting said slider arms until said claws make contact with sides of the two adjacent wheels opposite that contacted by said slider arm, and raising said support beam to lift one end of said vehicle.

* * * * *